United States Patent
Blair et al.

(10) Patent No.: US 10,558,771 B2
(45) Date of Patent: Feb. 11, 2020

(54) SYSTEMS AND METHODS FOR SECURITY AND SAFETY FAULT ANALYSIS USING INFORMATION FLOW

(71) Applicant: Tortuga Logic Inc., San Diego, CA (US)

(72) Inventors: Zachary Blair, San Diego, CA (US); Jason K. Oberg, San Diego, CA (US); Jonathan Valamehr, San Diego, CA (US)

(73) Assignee: Tortuga Logic Inc., San Jose, CA (US)

( * ) Notice: Subject to any disclaimer, the term of this patent is extended or adjusted under 35 U.S.C. 154(b) by 142 days.

(21) Appl. No.: 15/640,284

(22) Filed: Jun. 30, 2017

(65) Prior Publication Data

US 2019/0005173 A1    Jan. 3, 2019

(51) Int. Cl.
*G06F 17/50*    (2006.01)
*G06F 21/87*    (2013.01)

(52) U.S. Cl.
CPC ........ *G06F 17/5022* (2013.01); *G06F 17/504* (2013.01); *G06F 17/5054* (2013.01); *G06F 21/87* (2013.01)

(58) Field of Classification Search
CPC .................................................. G06F 17/5022
USPC ...................................................... 716/103
See application file for complete search history.

(56) References Cited

U.S. PATENT DOCUMENTS

| | | |
|---|---|---|
| 4,926,476 A | 5/1990 | Covey |
| 7,159,198 B1 | 1/2007 | Ip et al. |
| 7,590,513 B2 * | 9/2009 | Jiang ...................... G06F 11/008 703/2 |
| 7,873,953 B1 | 1/2011 | Pritchard et al. |
| 9,824,243 B2 | 11/2017 | Chen et al. |
| 2005/0240887 A1 * | 10/2005 | Rajski .............. G01R 31/31835 716/102 |
| 2007/0226663 A1 * | 9/2007 | Bormann .............. G06F 17/504 716/106 |
| 2008/0127009 A1 * | 5/2008 | Veneris ............... G06F 11/3608 716/103 |
| 2008/0148400 A1 | 6/2008 | Barron et al. |
| 2012/0210431 A1 | 8/2012 | Stahlberg et al. |
| 2012/0278893 A1 | 11/2012 | Jyothi et al. |
| 2014/0259161 A1 * | 9/2014 | Kastner ................. G06F 21/556 726/22 |

(Continued)

FOREIGN PATENT DOCUMENTS

WO    WO2014143912 A1    9/2014

*Primary Examiner* — Suresh Memula
(74) *Attorney, Agent, or Firm* — Fish & Richardson P.C.

(57) ABSTRACT

The present disclosure includes systems and methods relating to information flow and analyzing faults in integrated circuits for digital devices and microprocessor systems. In general, one implementation, involves a technique including: receiving a hardware design specifying an implementation for information flow in a hardware configuration; receiving one or more labels annotating the hardware design; receiving one or more fault properties specifying at least a fault type relating to the one or more labels for implementing an information flow model indicating a fault path in the hardware configuration; determining, for each of the one or more fault properties, a label value by translating the fault property into the information flow model; and automatically assigning a respective label value to each of the one or more labels in the hardware design.

10 Claims, 6 Drawing Sheets

(56) References Cited

U.S. PATENT DOCUMENTS

| | | | |
|---|---|---|---|
| 2014/0310673 A1* | 10/2014 | Alfieri | G06F 17/505 |
| | | | 716/136 |
| 2014/0317584 A1* | 10/2014 | Busch | G06F 17/504 |
| | | | 716/107 |
| 2014/0351775 A1* | 11/2014 | Alfieri | G06F 17/5022 |
| | | | 716/102 |
| 2015/0058997 A1 | 2/2015 | Lee et al. | |
| 2015/0180875 A1 | 6/2015 | Kay | |
| 2016/0026801 A1 | 1/2016 | Kastner et al. | |
| 2016/0098558 A1 | 4/2016 | Vedula et al. | |
| 2016/0098565 A1 | 4/2016 | Vedula et al. | |
| 2016/0162689 A1 | 6/2016 | Martinez et al. | |
| 2017/0076116 A1 | 3/2017 | Chen et al. | |
| 2017/0316227 A1 | 11/2017 | Oberg et al. | |

* cited by examiner

SYSTEMS AND METHODS FOR SECURITY AND SAFETY FAULT ANALYSIS USING INFORMATION FLOW

CROSS-REFERENCE TO RELATED APPLICATIONS

This application is related to U.S. patent application Ser. No. 15/141,392 entitled "GENERATING HARDWARE SECURITY LOGIC", filed Apr. 28, 2016, which is incorporated herein by reference in its entirety.

BACKGROUND

The present application describes systems and methods relating to information flow and analyzing faults in integrated circuits for digital devices and microprocessor systems.

Integrated circuits are ubiquitous and govern safety-critical systems, including automobiles, medical devices, and aerospace/defense systems. A failure in any one of these systems can potentially result in catastrophic losses, both financially and fatally for users and bystanders alike. Because of this, it is desirable for hardware designers developing these integrated circuits to provide integrated circuits that operate correctly and safely even in the presence of faults, which are defects that can potentially change the intended behavior of the system. However, some existing techniques for analyzing these effects of faults in integrated circuits are both cost-heavy and time-intensive, and eventually produce low-quality results. For example, hardware designers, can currently employ fault analysis techniques that include: 1) manual inspection of the design files, and 2) using fault-simulation platforms, which tend to give fault coverage numbers that may be significantly reduced (e.g., inadequate to meet verification standards for automotive and aeronautical systems). Hardware designers are looking for any solutions that can help them generate better results in less time.

SUMMARY

The present disclosure includes systems and methods relating to information flow and analyzing faults in integrated circuits for digital devices and microprocessor systems. According to an aspect, a method performed by data processing apparatus includes: A method performed by data processing apparatus, the method comprising: receiving a hardware design specifying an implementation for information flow in a hardware configuration, wherein the hardware design comprises at least two variables relating to the information flow; receiving one or more labels annotating the hardware design, wherein each of the one or more labels corresponds to a respective variable of the at least two variables; receiving one or more fault properties specifying at least a fault type relating to the one or more labels for implementing an information flow model indicating a fault path in the hardware configuration; determining, for each of the one or more fault properties, a label value by translating the fault property into the information flow model; and automatically assigning a respective label value to each of the one or more labels in the hardware design.

One or more of the following potential advantages may be provided. The disclosed systems and methods support an automated solution for analyzing faults in integrated circuits, and thereby assessing security and safety vulnerabilities that can potentially compromise the circuitry (or overall system). The methods and systems described herein leverage information flow tracking to analyze integrated circuits, and provide a platform, using an information flow tracking technology, for implementing fault detection. As a result, the disclosed techniques realize the advantages associated with time saving and increased verification coverage of fault tolerance. Furthermore, the techniques and system described herein can analyze the effects of several types of faults, and determine the effects of the presence of these faults on potentially changing the programmed behavior of the integrated circuit. Accordingly, the techniques described herein realizes a solution that allows hardware designers to analyze an entire set of faults that may negatively affect the hardware design, and achieve higher coverage (e.g., substantially close to 100%). In some implementations, the described techniques and systems can be used by hardware designers, for example architects and verification engineers, to ensure the functionality of the design prior to circuit fabrication (e.g., being sent to a fabrication facility) for secure and safety-critical operation. The embodiments provide a platform using an information flow tracking technology for hardware designers, as an example, to specify particular fault scenarios for analysis, automatically run the analysis, and receive increased coverage in an overall time that is substantially reduced in comparison to some existing techniques.

Details of one or more implementations are set forth in the accompanying drawings and the description below. Other features and potential advantages may be apparent from the description and drawings, and from the claims.

BRIEF DESCRIPTION OF THE DRAWINGS

Like reference symbols in the various drawings indicate like elements.

DETAILED DESCRIPTION

Figure 1:
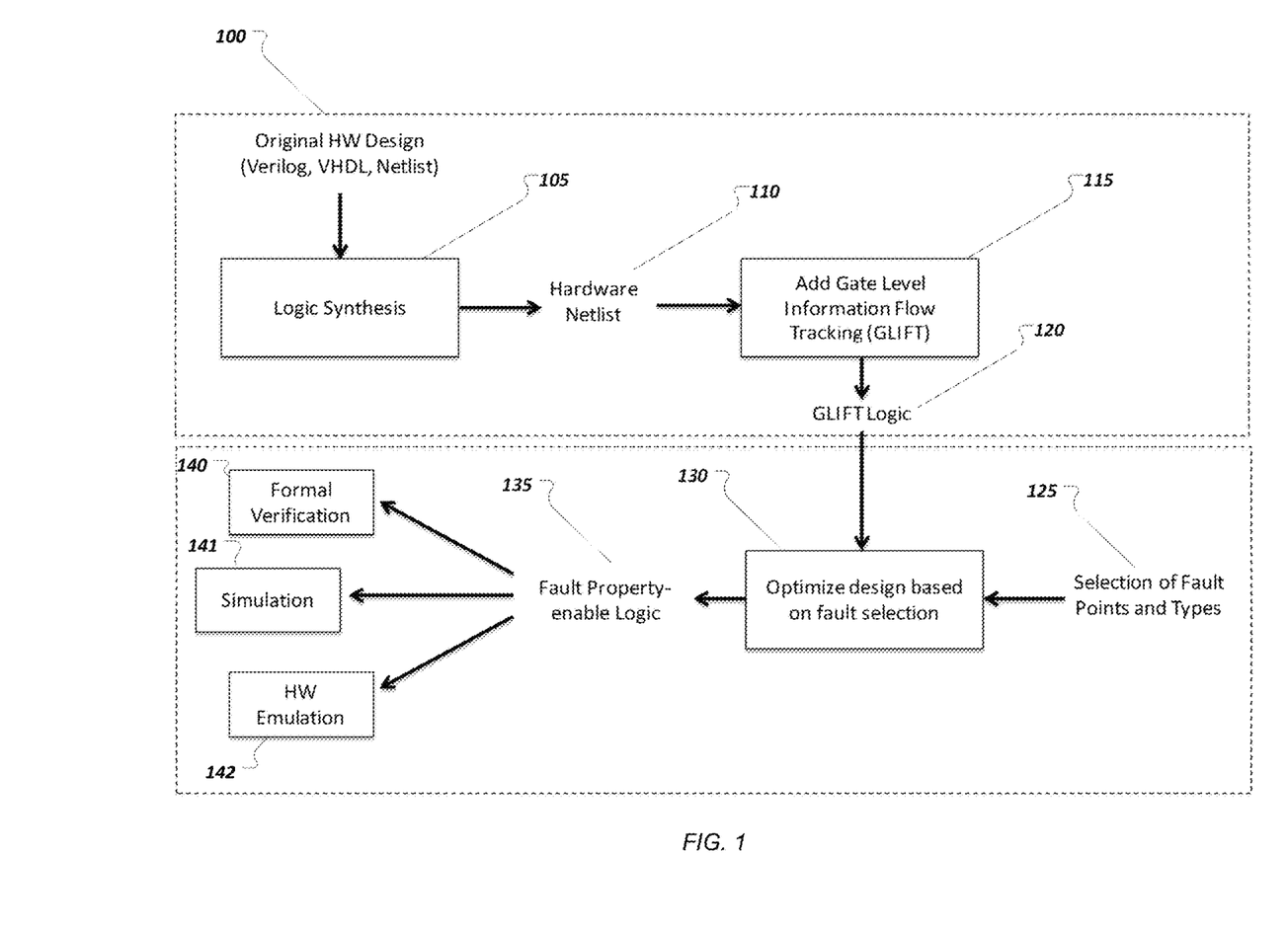
FIG. 1 illustrates an example process for optimizing a hardware design using a high-level fault specification language and information flow tracking techniques.

FIG. 1 illustrates an example process for optimizing a hardware design using a high-level fault specification language and information flow tracking techniques. Information flow tracking technology, for example Gate Level Information Flow Tracking (GLIFT) provides the capability for analyzing the flow of information in a hardware design by tracking the data as it moves throughout the system. Security can deal with illegal information flows within a system, for instance. Safety-criticalness can deal with failures within a circuit that can lead to improper and/or dangerous operation of the system when deployed in the field. The process 100 employs information flow tracking technology to develop a fault analysis platform, for example a platform to aid hardware designers in finding security and safety vulnerabilities based on tracking a fault as it propagates through the hardware design. Implementations involving employing GLIFT for hardware security mechanisms are disclosed in U.S. patent application Ser. No. 15/141,392 entitled "GENERATING HARDWARE SECURITY LOGIC", filed Apr. 28, 2016, which is incorporated herein by reference in its entirety. In the techniques and systems disclosed, the information flow tracking capabilities of information flow tracking technologies, such as GLIFT, are furthered leveraged for functional safety of hardware design through fault analysis.

According to the embodiments, safety is considered as a design constraint in the design of integrated circuits. The techniques and systems described can be used to analyze safety-critical applications, such as embedded automotive controllers and medical devices, which have requirements for fault tolerance. In the instances when a fault occurs within a chip, the techniques described can be used to analyze and potentially prevent its propagation to a pin which could create a catastrophic failure. Thus, the techniques disclosed, use an underlying concept which maps fault propagation into an information flow analysis problem, similar to the approach applied to security, in order to address safety-criticalness. The embodiments function to map fault analysis and propagation to information flow analysis. Accordingly, the systems and techniques model fault propagation in a manner that increases verification coverage of fault tolerance and assists hardware designers, for instance, in conforming to the existing standards with reduced time and effort.

In safety-critical applications, it can be important for computing systems to not behave in a manner that could violate the safety of the users due to environmental conditions or malicious actions. For example, it is not only important to ensure a design works correctly in a normal operating environment, but also works under unintended operational conditions, such as harsh temperature changes, radiation, physical tampering, and the like. In digital system environments, for example, fault analysis and propagation can be a set of techniques for identifying, quantifying, and understanding the effect that a potential unintended manipulation of binary digits, such as a "bit-flip" or "fault", in the hardware design may have on the overall system. Elements of an integrated circuit, such as all inputs, registers, gates, wires, and other elements of the circuit, are capable of affecting the output. Accordingly, since each of these elements have the potential to be faulty due to environmental or malicious circumstances, a modification to the function of the circuit could potentially cause unintended and unsafe effects on safety critical outputs of the system. The fault analysis techniques described can be used to determine the elements of the digital design that can affect a safety critical output. As a result, in some cases, countermeasures can be put into place to address the identified elements and outputs.

A hardware design is received 100 that can be employed in integrated circuit (IC) technology, such as fabrication of a Complimentary-Metal-Oxide-Semiconductor (CMOS) or silicon germanium (SiGe) die. In the implementations, receiving the hardware design can involve specifying an implementation for an electronic circuit or microprocessor for example, including the components, connectivity, flow of information between components, and logical arrangements. The hardware design can describe the circuit using various degrees of abstraction, including but not limited to: gate level, Register Transfer Level (RTL) level, algorithmic level, and behavioral levels. In some implementations, the hardware design can be received as a program received in, or otherwise including, a hardware description language (HDL), such as Verilog, Very High speed integrated circuit Hardware Description Language (VHDL), and Netlist for example. Thus, a hardware designer, for example, can employ a suitable HDL for generating the hardware design, and subsequently electronically communicating that hardware design to a processing apparatus for further analysis and synthesis.

In some implementations, at least a portion of the received hardware design is synthesized to gate level primitives, for example, in a logic synthesis process 105. Synthesis 105 can be a process for generating the low level hardware components, such as the gate level primitives. Thus, a result of performing synthesis 105 on the received hardware design can be constructing a hardware netlist 110 from the implementation specified in hardware design. The hardware netlist can be generated at the gate level and including a description of the connections within the hardware design. As an example, the generated netlist consists of a list of the terminals of the electronic components in the circuit, and the electrical conductors that interconnect the terminals. In some implementations, the hardware netlist is not optimized according to area and timing constraints associated with the circuit.

Thereafter, information flow tracking logic, illustrated in FIG. 1 as GLIFT logic, can be added 115, or otherwise inserted, into the hardware design at the gate level. Although GLIFT is illustrated, it should be appreciated that various other forms of information flow tracking technologies can be used with the disclosed techniques and systems, as deemed necessary and/or appropriate. Information flow tracking methodologies can be employed for analyzing, statically verifying, and dynamically managing the information-flow behavior for implementing a hardware logic. For example, the information flow tracking technology, such as GLIFT, implements full system information tracking at the logic gate level. Information flow tracking technology functions to associate each bit in the hardware design with a one-bit tag (e.g., taint bit), so as to indicate that the corresponding signal, which could potentially be associated with a fault, is to be tracked. Additionally, the information flow tracking technology supplements each gate in the hardware netlist, for example, with additional gates used to compute a propagation of the tag in the logic. Therefore, generating the resulting logic for information flow tracking, shown as GLIFT logic 120, includes logical components (i.e., bit and gates) that are adding to, or otherwise augmenting, the original hardware design, so as to implement fault analysis aspects (e.g., information flow) in the logic. In adding the information flow tracking logic, the technology can be used to analyze the propagation of faults in the design. In order to utilize information flow tracking to perform fault analysis and cover fault scenarios, the techniques and system described implement: a high-level language employed to allow for precise specification of fault analysis location and events; using fault properties specified in the high-level language to create a special information flow model that will enable fault analysis; and perform fault analysis on the hardware design including the fault logic, or an information flow model.

According to the embodiments, a high-level specification language implements the capability to select, or otherwise specify multiple fault properties, illustrated in FIG. 1 as the type fault (e.g., timing, stuck-at, transient) and location of faults 125. The fault, based on the fault properties are tracked using the information flow tracking technology 120 as desired. For instance, labels are assigned in the hardware design in accordance with the properties entered. Thus, fault scenarios that a hardware designer would be tasked with checking, can be specified using the high-level language. An information flow tracking logic can be implemented depending on the specified fault properties that designate various characteristics of the fault, such as conditions of propagation and the fault's behavior in certain conditions. Also, in some instances, conditions that create faults (e.g., thermal effects and radiation) can reoccur at various time intervals, as well as occurring in a single instance. Thus, according to an implementation, fault properties can include one or more constraints of the recurrence of faults. Accordingly, the properties are used to specify features used to model an assertion based on the recurrence constraint desired. Moreover, in certain situations, a fault's existence or its effect on the digital circuit is allowed because of existing protection mechanisms that are in place, such as triple-modular redundancy (TMR). In order to account for the conditions in which fault propagation may be allowable, the high-level fault specification language is configured to implement "safe conditions", for example, or flow conditions that do not trigger a failure in the desired fault property.

The high-level fault specification language, and the specified faults, can be translated into a set of augmentations to a hardware design and assertions to implement the information flow model and test the information flow properties. Tortuga's Logic's language can be used in some implementations, and is disclosed in U.S. patent application Ser. No. 15/141,392 entitled "GENERATING HARDWARE SECURITY LOGIC", filed Apr. 28, 2016, which is incorporated herein by reference in its entirety. Alternatively, other high-level languages may be utilized as deemed necessary and/or appropriate. The high-level fault specification language can be configured to provide a graphical user interface (GUI) that is a user-friendly environment for a designer to specify the fault properties, such as selection of fault points and types 125. There are several types of faults that can be specified by the high-level language to be further subjected to fault analysis. In some implementations, various operators are implemented within the high-level language to specify fault properties, as discussed in further detail in reference to FIG. 4. In some implementations, the high-level fault specification language can be configured to include fault metadata augmenting the hardware design, to be used in an analysis and testing for example.

Accordingly, the embodiments provide the ability to configure and/or create the fault property logic from a high-level language. As an example, a hardware engineer can program the various fault properties associated with the failure analysis aspects of hardware design in a manner that may use natural language, automation, and abstraction. Thus, using a high-level language implementation for receiving fault properties 125 may provide a process of developing a hardware fault logic that is simpler and more understandable in comparison to some earlier generations of secure hardware design languages. Moreover, programming fault properties in a high-level language may realize increased expressiveness, ease of design, and implementation efficiency.

Fault properties can be utilized for describing, and subsequently tracking, information flow, as associated with a fault, in the hardware design. In some implementations information flow restricts how information can flow through a hardware logic, and considers a wide range of safety vulnerabilities. Therefore, receiving fault properties in a high-level language 125 can involve specifying constraints that affect the information flow. As an example, fault properties can be used to identify which fault cannot pass, or otherwise propagate, and which safety critical components of the hardware cannot be affected or experience a failure triggered by a fault. In the implementations, fault properties received in high-level fault specification language can be dynamically translated, for example as compile-time, into a fault logic, for example at the gate level.

According to an embodiment, optimizing the hardware logic design 130 is performed based on the fault properties programmed in the high-level language. Optimization of the hardware logic can involve removing circuitry that may be deemed unnecessary in the design or operation of the information flow model, including the fault logic. For example, optimization can involve removing circuit elements that have no effect on safety critical outputs. Also, optimization can include adding circuitry determined to be needed, or otherwise necessary, in the logic. Optimization determinations in the embodiments can be related to various circuit performance metrics and constraints, such as efficient execution time. Hardware designs can be extremely large and complex. Consequently, the techniques described generate an information flow model implementing fault logic having an optimized design, that may increase the speed of fault analysis. Additionally, the implementations may provide the advantages of a reduced circuit area for the hardware design, such as decreasing space used on a semiconductor chip and reducing propagation delay, based on modification of the design in accordance with the fault properties.

The generated fault logic, implementing the fault properties, is thereafter enabled 135 and used for various analysis and design techniques. Thus, enabling the fault logic can involve additional techniques so as to further analyze and test the fault logic. In some implementations, enabling the fault logic 135 can involve compiling, so as to translate a logic into a format employed by the analysis and design functions, for example a formal verification solver 140 in some cases. As an example, the fault analysis techniques can be employed in validating the information flow model in order to verify the design, including the fault logic, is consistent with functional safety requirements and safety design constraints. The fault analysis functions performed using the fault property-enabled logic can include, but are not limited to: formal verification 140; simulation 141; and hardware emulation 142.

In some embodiments, formal verification 140 can include passing the information flow model to a formal solver, for example, in order to determine whether any behavior of the logic fails, or otherwise violates, a specified safety design constraint. As an example, the formal solver can ensure that a fault does propagate, or affect, a safety critical element. In other implementations, static fault analysis verification is performed in formal verification 140. Formal verification 140 can include a design-time verification of some time-sensitive fault properties. Although a formal solver is discussed, other forms of design verification can be used as deemed necessary and/or appropriate. In some alternative embodiments, compile-time verification of implemented information flow properties can be employed.

Additionally, the fault logic can also be communicated to a simulator, for example, configured to perform simulation 141. The simulation 141 can include employing a series of input tests, where values associated with particular input variables of the hardware design are applied to the logic. Subsequently, the behavior of the logic design is simulated for a duration, such as multiple design clock cycles, so as to observe and/or detected any safety property violations in the simulated behavior.

The hardware (HW) emulation 142 techniques can receive the fault logic so as to emulate the behavior of the circuit. HW emulation 142 can provide faster execution of circuit behavior simulations in an embodiment, and thereby may be better suited for debugging than simulation 141, for example.

The techniques described can provide various advantages that are twofold: 1) the information flow model optimizes the performance of analysis engines, such as formal verification coverage engines, to decrease time to meet coverage requirements, and 2) provides the capability of showing specific fault path information. The first aforementioned advantage may provide the ability to increase the fault coverage number (to meet the standard) in significantly less time (to reduce cost). The second aforementioned advantage may provide users the ability to understand and debug faulty behavior if a fault is discovered.

Figure 2:
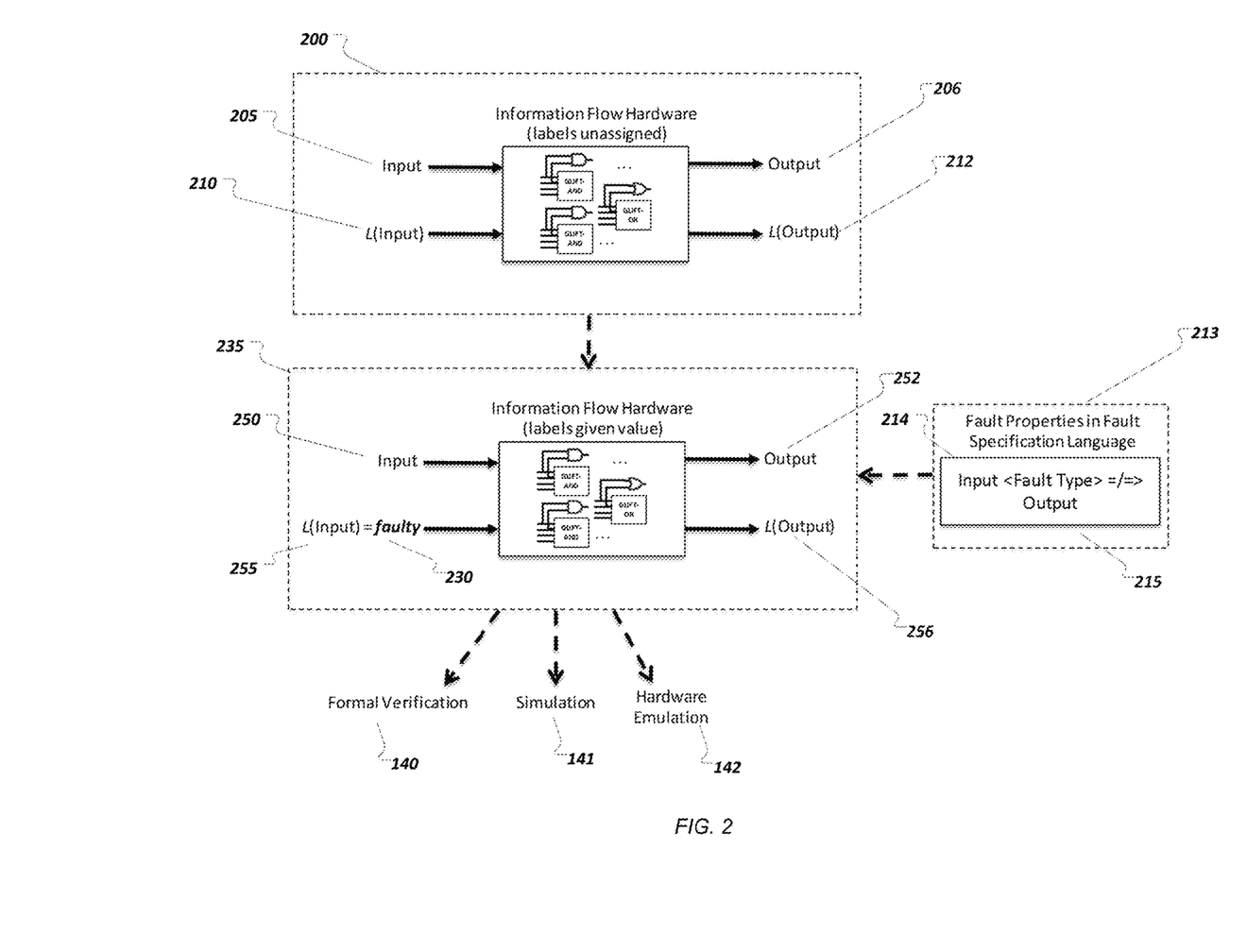
FIG. 2 illustrates an example of a process for generating fault logic using a high-level fault specification language and information flow tracking techniques.

FIG. 2 illustrates an example of a process for generating fault logic using a high-level fault specification language and information flow tracking techniques. As a general discussion of faults to better illustrate the manner in which GLIFT is used in analyzing faults, fault coverage can be given by the equation:

$$C_{faults} = (I_{faults}/T_{faults}) \qquad (1)$$

where, $I_{faults}$ are the number of faults identified during fault analysis; and $T_{faults}$ are the number of possible faults that could occur (i.e., the number of digital elements in the design that can affect a safety critical output).

Thus, increasing coverage can include: 1) increasing the number of faults identified ($I_{faults}$); or decreasing the total possible faults ($T_{faults}$). Increasing the $I_{faults}$, in some instances, can require the fault analysis to detect that a particular element, if faulty, can affect a safety critical output. Then, a countermeasure or redundancy mechanism, such as a TMR, can be shown to address the identified fault. The techniques described leverage GLIFT track fault signals in a design and observe, or otherwise track, the propagation of the fault signals. As discussed above in reference to utilizing GLIFT, fault propagation can be approached in a similar manner as information flow. Consequently, the techniques are used to identify faults and thereby increase $I_{faults}$. In some cases, to decrease $T_{faults}$, GLIFT can be used to find the set of elements that cannot actually affect a safety critical output. That is, GLIFT can also be utilized to determine the set of faults that do not propagate. In doing so, $C_{faults}$ can be increased by increasing $I_{faults}$ and by decreasing $T_{faults}$.

The process shown in FIG. 2 includes a hardware design 200 that can be a dedicated portion of a hardware design for implementing the safety-critical aspects of the circuitry, for example. In some embodiments, the hardware design 200 can be a logic specified at the gate level, and generated according to the techniques previously described in connection with FIG. 1 using information flow tracking technology. As an example, the hardware design 200 can be implemented as a GLIFT logic. According to the embodiments, the hardware design 200 can include a set of inputs 205 and outputs 206 corresponding to input ports and output ports, respectively, included in the configuration of the hardware logic. Additionally, in some implementations, the inputs 205 and outputs 206 can be represented as one or more variables used in mechanisms for specifying a hardware design, for example a HDL.

Additionally, the variables can be further associated with labels 210, 212. As shown in FIG. 2, a hardware design 200 is annotated with label 210 that corresponds to an input. Also, label 212 corresponds to an output of the hardware design. It should be appreciated that one or more labels can be appropriately associated with any hardware element, or variable, specified in a hardware design as deemed suitable. The labels 210, 212 can be used to designate that a specific source, for example signal input 205, is being tracked to observe its propagation. In some implementations, the labels 210, 212 can be utilized as annotations to the specified hardware design. Accordingly, the labels 210, 212 can be applied to augment a hardware design 200 in HDL, for example, with more natural language descriptive terms, usable in the fault-specification language for the components, data, and connectivity within the hardware logic. In the embodiments, at least one label is including in the hardware design 200. Therefore, implementing labels 210, 212 may realize certain benefits associated with high-level programming language techniques, and thereby may increasing ease of design in the embodiments.

According to the implementations, fault properties for a hardware design can be received in a high-level fault specification language 213. Implementing techniques for employing a high-level programming language for specifying information flow and/or fault properties are described in connection with FIG. 1. In the implementations, information flow control mechanisms can operate to associate the labels 210, 212 with the data and the hardware components, or resources, within the hardware design 200. For example, fault property 213 includes labels 214, 215 and specifies an information flow associated with a fault. For instance, fault properties 213 specify characteristics associated with the fault (e.g., conditions for fault propagation, and fault points) and in turn the information flow depending on the fault's behavior can be designated. The fault property 213 specifies a particular fault behavior to implement an information flow within a hardware design. As shown in FIG. 2, the fault property 213 can be specified in an expression implemented in a high-level fault specification language, for example, "Input<Fault Type>=/=>Output", which checks an information flow between source (e.g., Input) and destination (e.g., Output). The fault property 213 illustrated in FIG. 2 defines, or otherwise specifies that in an information flow associated with the fault type "<Fault Type>", that Input should not flow to Output. In some embodiments, the high-level fault specification language can implement various variables, objects, complex arithmetic or boolean expressions, subroutines and functions for defining fault properties. As an example, assertion language can specify labels, signals, registers, expressions, conditionals, logical operators, and keywords, allowing for a high-level implementation of information flow. In some embodiments, fault properties 213 can be further specified as one or more lattices.

Thereafter, the embodiments can function to automatically assign a value to each respective label in a fault logic design that corresponds to a label association. In an implementation, the fault hardware design 200 can be augmented with the particular value 230 assigned to each label 255 corresponding to a fault property 213. As displayed in FIG. 2, label 255 is assigned a value associated with "faulty" within the hardware logic 235. For example, an information flow tracking logic that employs a one-bit tag, or label, can be automatically augmented by setting the labels corresponding to "faulty" to 1. In cases where a specified fault and a circuit element within the hardware design are equivalent, that element can be correspondingly labeled, or otherwise deemed as "faulty".

Otherwise, in accordance with the disclosed techniques, determining that a circuit element is "faulty" refers to a characteristic indicating an improper value, namely a circuit element (e.g., signal) having a current value that is different than an expected value within the original hardware design. Thus, the resulting hardware logic 235 includes a fault logic implementing labels that are assigned to values, and logical outputs associated with the fault properties. In this case, it is possible for the faulty signal to not be equivalent to the labeled signal. For example, a signal can be deemed "faulty", while another signal can have a label set to 1. In some implementations, the hardware logic 235 is modified to further include tracking logic, as well as control logic to begin/end information tracking depending on the type of fault and constraints applied to the fault's behavior. The control logic applied to the hardware logic 235 to begin tracking will reflect behavior of the fault.

The hardware design 235 also includes variables 250,252 and label 256, which is not assigned a value. Thus, according to some implementations, values 230 are assigned to a portion of the labels and/or variable present in the hardware design. In the implementation, values can be automatically assigned to every shadow bit) within a hardware design. Also, in some implementations, a value can be automatically assigned to each shadow logic gate of the tracking logic implemented using various secure hardware design techniques. In some techniques, hardware designers manually specify the labels and associated values, for example in the case of a hardware design, which may exacerbate programming (and debugging) difficulties in the design processes. The process of manually editing and/or annotating a hardware design, which at the gate-level for a complex design, for example, can be cumbersome and difficult to configure. The embodiments implement a technique that leverages information flow in the fault logic design 235, while providing an automated solution that overcomes the challenges associated with manual aspects of information flow in hardware designs.

In an implementation, the values for labels are computed, or otherwise evaluated, and inserted into the fault logic at compile-time. The compiler can be employed to insert bits and/or logic dynamically into the hardware design, for example, to achieve the automated aspects of the embodiments. Thus, a compiler can be employed to translate the fault properties 213 implemented using high-level language into a synthesizable fault logic configured to implement the information flow model. In some embodiments, a compiler supports automatic translator capabilities that can be used to translate codes from a high-level fault specification language into a HDL. As an example, the one or more fault properties are received in Sentinel, which is an example of a high-level fault specification language. Some properties in Sentinel are specific to faults, and can be translated into the appropriate information flow model. After properties are created and used to build an information flow model, information flow analysis can be performed by interfacing the information flow model into an analysis platform, such as formal verification solver 140, for example.

In some implementations, the fault analysis approach involves increasing the number of faults identified ($I_{faults}$) while simultaneously decreasing the total number of faults that can propagate ($T_{faults}$). To decrease the number of circuit elements $T_{faults}$, any elements which are determined to have no effect of safety-critical outputs should be removed. As an example, determining which circuit elements have no effect on fault analysis, can be performed using the information flow tracking technology paired with an analysis platform, for instance a formal verification solver. In cases where a label 255 is assigned the value of "faulty", then the system will perform analysis of the tracking logic to determine whether the faulty signal can ever reach a safety critical output. If it is formally proven that the "faulty" bit cannot reach the safety critical output, then the particular circuit element can be removed from the set of faulty signals and the value of $T_{faults}$ decremented. Accordingly, this can be repeated iteratively for every potential fault in the system.

In the case of increasing the number of detectable faults ($I_{faults}$), an approach can be utilized which identifies that a circuit element can affect a safety critical output. As in the case with $T_{faults}$, circuit elements can be assigned a value of "faulty" and then analyzed to see if the associated flow propagates to a safety critical output. Then, the design must have a mechanism in place to recover from this before $I_{faults}$ can be increased, and thus "covered." For instance, systems can pool a set of test-vectors for fault analysis which simulate all of the faults and can continuously run these test vectors through the design. Subsequently, a flag will be raised if a fault is detected. According to some implementations, the results of the described fault analysis techniques identify the test vector causing the failure in addition to whether the fault propagates. Therefore, test vectors that are deemed valuable for covering a fault can be determined by the designers using the embodiments. Furthermore, the techniques can be utilized by a user to increase the $I_{faults}$, by adding an identified test vector to the pool of fault stimuli. In accordance with this abovementioned approach, the analysis repeats for every circuit element in the design. In order to decrease run time associated with this approach, a set of inconclusive faults can be used as input to the fault analysis platform of the embodiments, thereby reducing the number of faults needed to be analyzed.

Figure 3:
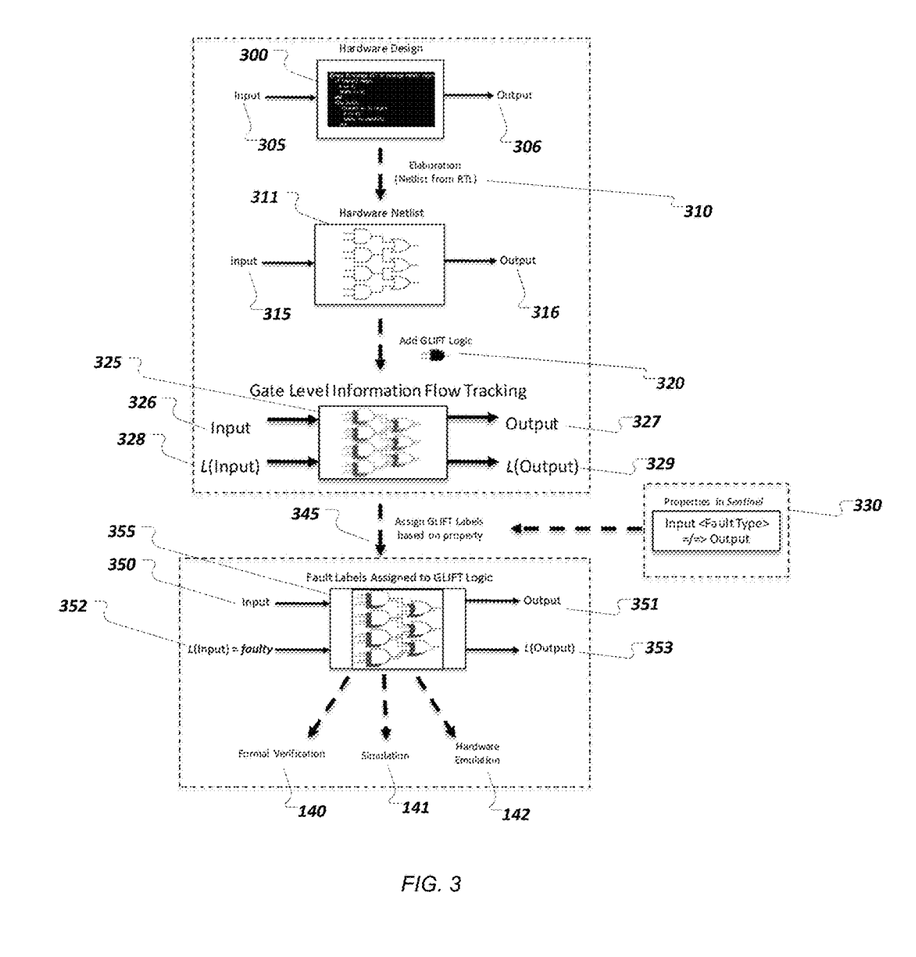
FIG. 3 illustrates an example of a process for generating fault using a Gate Level Information Flow (GLIFT) hardware logic and fault properties.

FIG. 3 illustrates an example process for implementing a Gate Level Information Flow (GLIFT) hardware logic using a high-level fault specification language. A hardware design is received 300. In some implementations, the hardware design can be received at a RTL level of abstraction in a HDL, such as Verilog, for example. Moreover, the RTL level hardware design can specify the electronic circuit configuration including signals between hardware registers and the logical operations performed on the signals. The hardware design can include one or more variables 305, 306. As shown in FIG. 3, the variable 305 is associated with "Input" and 306 is associated with "Output". In some embodiments, the RTL modeled hardware design can be conveyed into a logic synthesizer and resultantly elaborated into, or otherwise employed to generate, a gate-level abstraction 310 of the hardware design. Generating a gate-level model of the hardware design can include creating a Netlist from the RTL design 311. The generated hardware Netlist, as displayed in FIG. 3, can include terminals ("pins") of the hardware logic components and their connections in the circuit design. For example, the Netlist model for the hardware design can include terminals 315, 316 that can be associated with terminals "Input" and "Output" respectively.

In some embodiments, information flow tracking logic, illustrated in FIG. 3 as GLIFT logic 320 can be added to, or used to augment, the hardware design. The implementations for adding information flow tracking logic can involve techniques as described in connection with FIGS. 1-2. The resulting hardware design including the information flow tracking mechanisms, for example a GLIFT hardware design 325 includes shadow logic and shadow bits (e.g., associated with each logic gate and bit of the hardware design), as illustrated in FIG. 3. According to the embodiments, the GLIFT hardware design 325 includes one or more variables that can be used to represent terminals, for example variables 326, 328. Also, the GLIFT hardware design 325 can include at least one label, such as labels 328, 329.

Additionally, various fault properties 330 can be received specifying the fault characteristics. In the embodiments, receiving fault properties can involve a high-level fault specification language employed to generate a program including the fault properties. For instance, the fault properties can be specified using Sentinel. In some implementations, Sentinel, which is used for specifying the fault properties 330, is designed to be a high-level language to allow users to specify their fault properties, while abstracting away the hardware augmentations (i.e., GLIFT) generated for the designs. In some implementations, language features can be implemented as a combination of hardware augmentations and System Verilog Assertions (SVAs). The combination of hardware augmentations and SVAs can implement the information flow model, indicating a fault path of the specified fault based on information flow tracking techniques. Also, the information flow model can be used as input to formal verification 140 in order to produce fault analysis results such as a pass/fail, for example. Fault properties 330 written by the user in Sentinel can specify the number/frequency of fault occurrences and can be constrained to reflect the expected behavior of the fault. Also, for designs in which a detection/correction mechanism is employed, "safe propagation" conditions can be specified using properties in Sentinel 330, and the assertion fails if the fault does not propagate to the mechanism. Thus, according to the implementations, the Information Flow Model involves utilizing appropriate hardware augmentation, SVAs, and formal solver constraints to accurately reflect the specified Sentinel properties 330.

Further details for specifying the fault properties 330, and subsequently generating the corresponding fault logic from the fault properties involve techniques as described in connection with FIGS. 1-2.

Thereafter, in the implementations, t labels within the information flow tracking logic are automatically assigned a value 345 based on the fault properties. As displayed in FIG. 3, label 352 is assigned a value of "faulty". The embodiments can function to perform an automated technique for assigning values for labels in a hardware design 355. In some implementations, each shadow bit of an information flow tracking logic is automatically evaluated. The techniques described can allow for increased configurability of the logic, by implementing fault properties using of a high-level fault specification language. Moreover, the embodiments of FIG. 3 support configuration of a fault logic by employing information flow tracking techniques in concert with high-level fault specification language capabilities. The hardware augmentations, such as illustrated in the GLIFT logic 325, are used for fault analysis, and not permanently inserted into the hardware design (not included in fabrication).

In some implementations, the hardware design is modified to include the fault logic, which is the tracking logic, as well as control the logic to conditionally begin/end information tracking to implement the information flow model. Depending on the type of fault and constraints specified by the fault properties 330, the control logic will augment the hardware design to appropriate flow condition triggers (e.g., fault path) and implement the information flow model. For example, the conditions on which faults will be observed are different for various types of faults (e.g., stuck-at, random transient, and timing errors). Consequently, control logic is applied to the hardware logic 355 to being the flow tracking techniques that can reflect the fault's behavior within the design. In some cases, to implement the information flow model using the fault logic, constraints and assertions are generated alongside the hardware logic 355 and passed to an analysis platform, such as formal verification solver 140. In this instance, the constraints for fault-related properties are transformed into arguments that can be interpreted by the formal verification solver 140.

In some implementation, the hardware logic 355, implementing the information flow model, can be further utilized to perform fault analysis and additional hardware design techniques. Such analysis functions performed using the hardware logic 355 can include, but are not limited to: formal verification 140; simulation 141; and hardware emulation 142. Also, some embodiments include implementing a change in the fault properties, or configuration of the logic, based on detecting a violation of safety critical policies (e.g., fault affecting a safety critical output). For example, during execution of a logic analysis function, a fault that is determined to violate one or more safety properties specified for the hardware design (e.g., based on the fault path indicated by the information flow model) can be intercepted. As a result, any particular fault property that can be identified as being associated with a safety violation, as well as the hardware logic, can be reconfigured.

In accordance with the system and techniques described, there are several fault types that can be specified in a fault specification language (as shown in FIG. 2) for fault analysis. Accordingly, an information flow model can be configured to appropriately reflect the conditions in which the fault will be observed during fault analysis (i.e., based on the fault properties). For example, types of faults that can be specified in the high-level fault specification language include, but are not limited to: timing faults, stuck-at faults, transient faults, and the like.

Thus, the information flow can be applied, as it may be desirable to track propagation and then analyze these types of faults in safety critical hardware designs, using the techniques described herein. In general, most existing faults can be modeled, including permanent (stuck-at or FPGA misconfiguration) and transient (timing, radiation, etc.) using information flow tracking technology. The effects of each of these faults can be detected and analyzed by tracking the effect a signal has on a safety critical output. In other words, the effects can be analyzed by tracking that signal's information flow using information flow tracking technology. Also, a fault's effects can be analyzed using the steps of verification including simulation, formal verification, or emulation. For purposes of discussion, information flow tracking capabilities with an analysis platform are described in detail here. This allows for the signal to be tracked at any time in which a fault would change the value of the signal being analyzed for safety and security.

Timing faults occur when a particular bit did not properly stabilize prior to be latched by a stateful element like a register or flip-flop. Timing faults can occur primarily due to environmental conditions, but can also occur due to power glitches and so on. Timing faults are problematic for both safety and security (e.g., an attacker can cause a timing fault to occur to extract some critical information from the device). According to the embodiments, information flow tracking supports the ability to track information flows at cycles in which a bit could be different. For example, assigning a signal a "faulty" value if (and only if) it could have taken a different value prior to being latched. Support for implementing these faults can be provided using the high-level fault specification language to express them, in concert with the information flow tracking technology as described herein.

Figure 4:
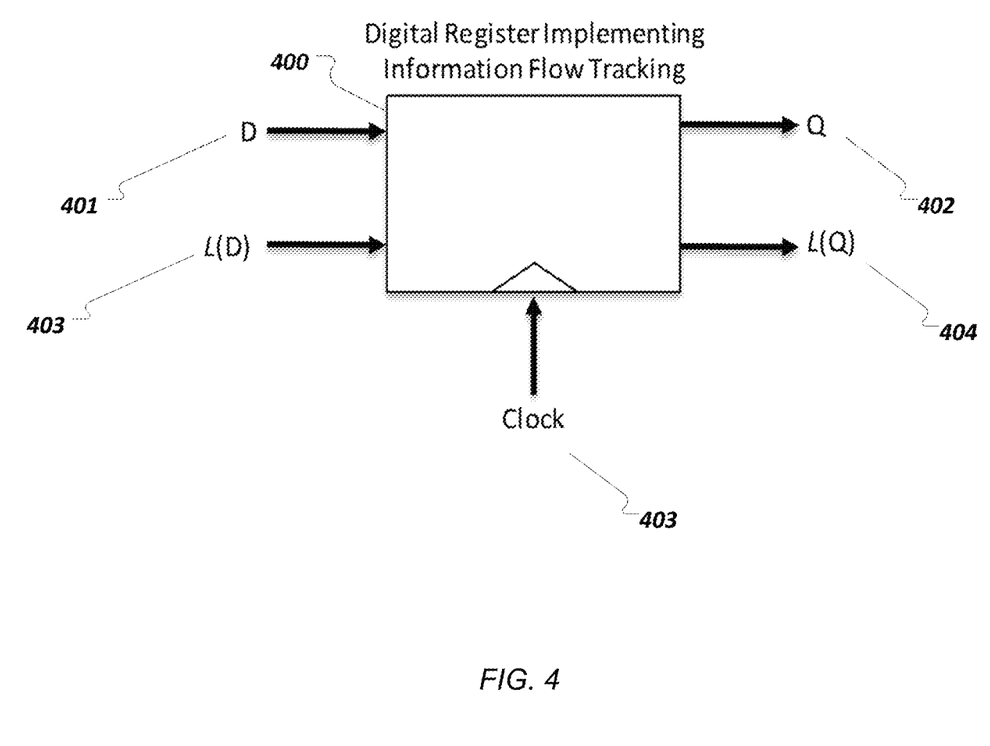
FIG. 4 illustrates an example of a register implementing faults specified using the high-level fault specification language.

FIG. 4 illustrates an example of a register implementing information flow tracking and tracking a fault specified using the high-level fault specification language. That is, input D 401 and its associated output Q 402 are shown with their corresponding labels (e.g., taint bit), for information flow tracking, L(D) 403 and L(Q) 404. Timing faults can be applied to a digital register 400, implemented in a hardware design. The value D 401 appears at the output Q 402 on the positive edge (0 to 1 change) of the input clock 403. In an example, the digital register 400 would undergo a similar modification in which the hardware is augmented using information flow tracking technology (as shown FIG. 3), illustrated as L(D) 403 and L(Q) 404. In the instance of a change of the clock 403 (timing), or a transient fault, the output Q 402 could potentially produce incorrect results. As such, it could be desirable to track the propagation of the fault in the environment. As an example, a timing fault property can be expressed as:

$$Q \text{ when } (D \oplus Q) \quad (2)$$

As a result, Q 402 is faulty in the event that D 401 and Q 402 could be different. In other words, a change in timing of the digital register 400 would have an observable effect on the output of the register. Note that the "when" operator is the ability to label a signal (Q in this case) based on some event (D⊕Q). (D⊕Q) is true when D and Q are different.

For stuck-at faults, which can appear on any wire or register in the design, these faults occur when a signal gets stuck at a 0 or 1. To specify this using a high-level fault specification language, for example, to be translated into implementing the information flow, stuck-at-faults can be expressed as:

$$D \text{ when } D==1 \quad (3)$$

to label D as faulty when D is being analyzed as a stuck-at 0 fault.

$$D \text{ when } D==0 \quad (4)$$

to label D as faulty when D is being analyzed as a stuck-at 1 fault.

The expressions refer to the digital register 400, as an example for discussion, but stuck-at faults are not restricted to registers.

The destination of information flow (right-hand side of "=/=>" operator) can be optional in a simulation, emulation, or hardware IP environment. In these cases, locations that the fault propagates to can be shown, and the locations are not restricted to a single location and/or element. In some cases, the destination is needed for use in a formal verification environment.

Additionally, stuck-at faults can be a fault that is irreversible. Meaning that an event caused a particular circuit element to now be fixed ("stuck-at") a particular value: 0 or 1 and will not be reversed when the system is restarted or rebooted. This can be caused by wires accidentally shorting, logic gates breaking down over time, and so on. To address fault analysis of stuck-at faults, we can use the following procedure with GLIFT: 1) Stuck-At-1 (SA1) faults would not impact the design if the signal's value were intended to be 1; and 2) Stuck-At-0 (SA0), the same concept applies for SA1 except that information flow will be tracked when data takes a 1. Thus, tracking the flow of the fault when the signal takes a 0 value is needed. For instance, the high-level fault specification is configured for stating that information flow should only be tracked on a certain event with our when operator. In this particular case, when the signal is 0.

Transient faults can be inserted based on a trigger condition that happens at a limited occurrence, for instance once. For example, if there was a trigger condition trigger which is the source of some faulty behavior, a fault property can be expressed as:

$$D \text{ when trigger}$$

Like stuck-at faults, the destination of the "=/=>" can be applied for using the method with formal verification platforms. However, transient faults, unlike stuck-at, can cause a particular bit to flip but they are not persistent over time and will often correct themselves after system reset. These faults can often occur due to changes in temperature or cosmic radiation causing a bit to flip or remain a certain value. To analyze this using information flow tracking technology, tracking the faulty signal can begin at cycle 0 (because the fault could occur at any time) and see if that signal can affect the safety critical output.

Each of the abovementioned faults, including any additional faults deemed necessary or appropriate to be included in the embodiments, are implemented within the disclosed techniques utilizing properties that can be expressed using a language and result in unique information flow tracking logic that are specific to those fault properties. Accordingly, as an increased number of faults can be specified and analyzed, coverage can also be increased by using the described systems and techniques.

Figure 5:
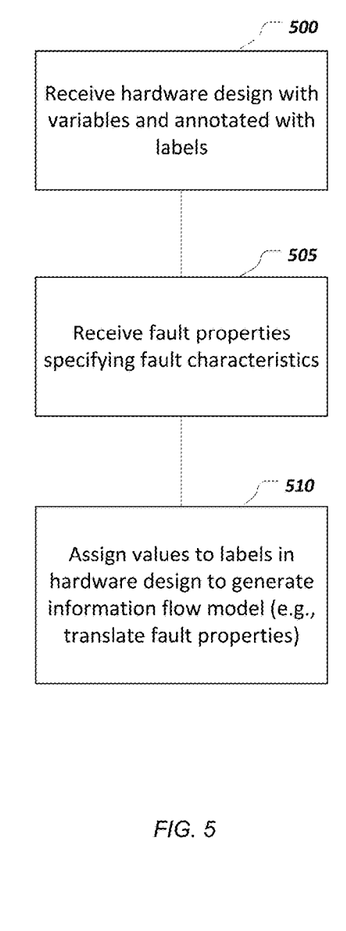
FIG. 5 illustrates a block diagram of an example of a process for generating fault logic using information flow tracking techniques.

FIG. 5 illustrates a block diagram of an example of a process for generating fault logic using information flow tracking techniques. According to the embodiments, a data processing apparatus (shown in FIG. 6) can be employed for performing the functions of the described process. A hardware design for an IC chip implementation, for example, is received 500. Receiving the hardware design can include generating a source code including multiple variables, using a HDL, for instance, so as to specify the circuit configuration. In the implementations, the received hardware design is annotated with at least one fault label. The fault labels may provide more natural language terminology for the variables in the hardware design, thereby increasing the ease of use in the hardware design process.

Thereafter, one or more fault properties are received 505 for specifying various characteristics of at a fault that are associated with the fault's behavior and determining how the fault will be observed, or otherwise tracked, using the information flow techniques. In some cases, at least one fault property is entered, for example a fault type (e.g., timing, stuck-at, transient). In some cases, more than one fault property is received, for example in addition to the fault type, such as fault constraints, and fault propagation conditions. As a result, the fault properties can be used for specifying information flow regarding a fault, such as outlining constraints pertaining to how a fault propagates between components of the circuit. Additionally, the embodiments implement receiving the one or more fault properties in a high-level language, for example Sentinel language. As an example, a fault point can be specified as a fault property at 505. In some implementations, GLIFT logic is used for insertion into the hardware design, and assigning the one or more labels to the GLIFT logic.

Subsequently, at 510, the fault properties can then be utilized for automatically assigning a respective value to each corresponding label in a hardware design. As a result, some elements in the hardware are assigned a value to be designated as "faulty." The values assigned to particular fault label can be determined in accordance with generating an information flow model. The information flow model includes the fault logic, which can be implemented as the hardware augmentations (i.e., label bits), control logic, tracking logic, and SVAs used for information tracking associated with the fault. Accordingly, an automated process of assigning values (e.g., corresponding to safety-critical values) to the labels within a hardware design is employed. The automatic process can result in an information flow model, that depicts, or otherwise indicates, the fault path. In some cases, the information flow model is used by an analysis platform, in order to perform fault analysis.

A label annotating a hardware design can be assigned a value that is consistent with the fault properties, depending on the type of fault and constraints applied to the fault's behavior, without the need for manually setting bits by a hardware engineer. For instance, signals and/or elements indicated as "faulty" can correspondingly be assigned values that cause other parts of the circuitry to automatically be assigned "faulty" values, based on the flow of information (propagating the fault). In some implementations, automatically assigning values to labels within a hardware design is a compile-time operation that further includes translating the fault properties received in the high-level fault specification language. Thus, the techniques as described in connection with FIG. 3, implements specifying information fault properties at a higher level of abstraction, and automatically performing some fault analysis aspects of the hardware logic design based on the abstraction (i.e., setting the labels).

Figure 6:
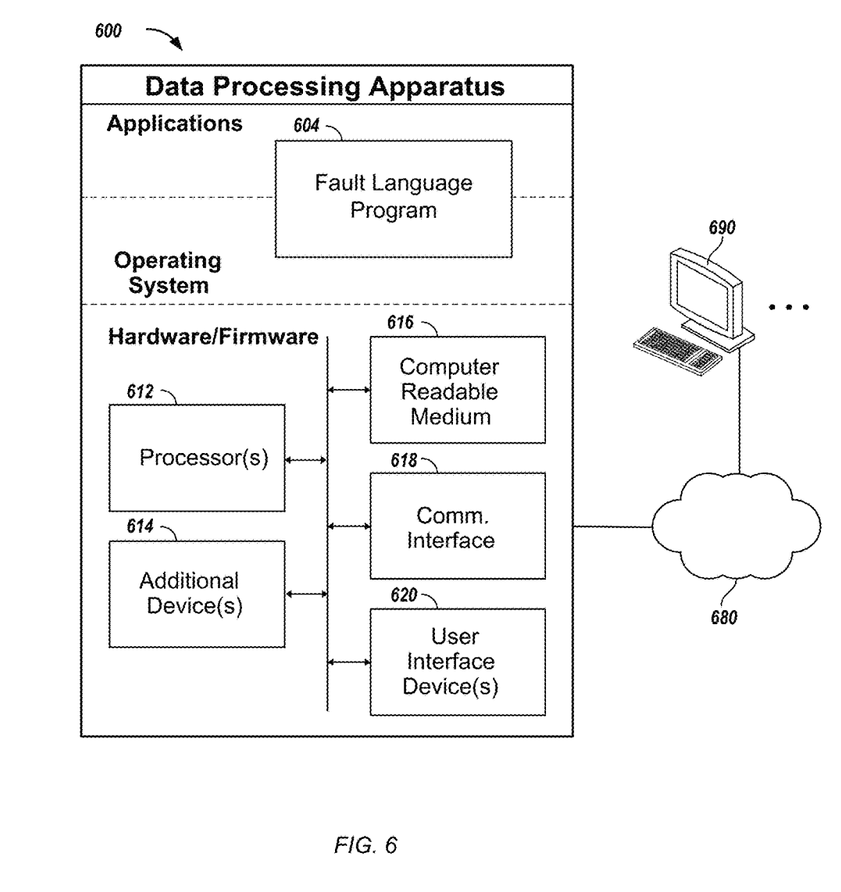
FIG. 6 is a schematic diagram of a data processing system used to implement the systems and methods described herein.

FIG. 6 is a schematic diagram of a data processing system including a data processing apparatus 600, which can be programmed as a client or as a server. The data processing apparatus 600 is connected with one or more computers 690 through a network 680. While only one computer is shown in FIG. 6 as the data processing apparatus 600, multiple computers can be used. The data processing apparatus 600 includes various software modules, which can be distributed between an applications layer and an operating system. These can include executable and/or interpretable software programs or libraries, including tools and services for hardware design involving specifying an implementation of an electronic circuit or microprocessor, such as HDL programs and compilers for translating a high-level fault speciation language into a fault logic, for example. In some implementations, the data processing apparatus 600 includes a Fault Language Program 604 that can implement the systems and techniques described above and variations thereof for programming, or otherwise specifying, one or more fault properties about a hardware design.

The Fault Language Program 604 can implement a high-level programming language using systems and techniques for specifying information flow and/or fault properties further described in connection with FIGS. 1-5 and variations thereof. Regardless, of the operational details, the number of software modules used can vary from one implementation to another. Moreover, the software modules can be distributed on one or more data processing apparatus connected by one or more computer networks or other suitable communication networks.

The data processing apparatus 600 also includes hardware or firmware devices including one or more processors 612, one or more additional devices 614, a computer readable medium 616, a communication interface 618, and one or more user interface devices 620. Each processor 612 is capable of processing instructions for execution within the data processing apparatus 600. In some implementations, the processor 612 is a single or multi-threaded processor. Each processor 612 is capable of processing instructions stored on the computer readable medium 616 or on a storage device such as one of the additional devices 614. The data processing apparatus 600 uses its communication interface 618 to communicate with one or more computers 690, for example, over a network 680. In some implementations, the computers 690 can be employed to execute logic analysis functions, such as formal verification and emulation. Examples of user interface devices 620 include a display, a camera, a speaker, a microphone, a tactile feedback device, a keyboard, and a mouse. The data processing apparatus 600 can store instructions that implement operations as described above, for example, on the computer readable medium 616 or one or more additional devices 614, for example, one or more of a floppy disk device, a hard disk device, an optical disk device, a tape device, and a solid state memory device.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims. In addition, the actions recited in the claims can be performed in a different order and still achieve desirable results.

What is claimed is:

1. A method performed by data processing apparatus, the method comprising:
   receiving a hardware design specifying an implementation for information flow in a hardware configuration, wherein the hardware design comprises at least two variables relating to the information flow;
   receiving one or more labels annotating the hardware design, wherein each of the one or more labels corresponds to a respective variable of the at least two variables;
   receiving one or more fault properties specifying at least a fault type relating to the one or more labels for implementing an information flow model indicating a fault path in the hardware configuration;
   determining, for each of the one or more fault properties, a label value by translating the fault property into the information flow model; and
   automatically assigning a respective label value to each of the one or more labels in the hardware design.

2. The method of claim 1, wherein the information flow model is used to generate a fault analysis result.

3. The method of claim 2, wherein the fault analysis result is derived by analyzing the fault information flow model to determine whether the fault path propagates to one or more safety-critical outputs in the hardware configuration.

4. The method of claim 3, wherein the fault analysis result comprises identifying circuitry in the hardware design that affects the one or more safety-critical outputs in the hardware design, based on the determination.

5. The method of claim 2, wherein the fault analysis result is generated by an analysis platform, and the analysis platform receives the information flow model and input.

6. The method of claim 1, wherein the one or more fault properties is received in a high-level fault specification language.

7. The method of claim 6, wherein the translation of the one or more fault properties into the information flow model comprises using the high-level fault language to create a fault logic in the hardware design, wherein the fault logic implements the information flow model.

8. The method of claim 7, wherein the method further comprises:

modifying the hardware design to include the fault logic, wherein the fault logic comprises tracking logic and control logic that are usable to determine the fault path in accordance with the one or more fault properties specifying fault type and constraints applied to a behavior associated with the fault type.

9. The method of claim 1, wherein at least one of the label values assigned to each of the one or more labels in the hardware design indicates a faulty value.

10. The method of claim 9, wherein the faulty value indicates that a current value corresponding to an element in the hardware design differs from an expected value for the element in an original hardware design.

* * * * *